United States Patent
Darbha et al.

(10) Patent No.: US 10,462,194 B2
(45) Date of Patent: Oct. 29, 2019

(54) MINIMIZING PRODUCTIVITY LOSS IN A COLLABORATIVE SHARING ENVIRONMENT

(71) Applicant: Cisco Technology, Inc., San Jose, CA (US)

(72) Inventors: Rama Darbha, Raleigh, NC (US); Magnus Mortensen, Raleigh, NC (US); Jay Kemper Johnston, Raleigh, NC (US); David C. White, Jr., Durham, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 810 days.

(21) Appl. No.: 14/618,532

(22) Filed: Feb. 10, 2015

(65) Prior Publication Data

US 2016/0234258 A1 Aug. 11, 2016

(51) Int. Cl.
*G06F 15/16* (2006.01)
*H04L 29/06* (2006.01)
*H04L 29/08* (2006.01)

(52) U.S. Cl.
CPC ........ *H04L 65/1069* (2013.01); *H04L 67/025* (2013.01); *H04L 67/141* (2013.01); *H04L 67/38* (2013.01)

(58) Field of Classification Search
CPC ...... G06Q 50/01; G06Q 10/10; G06Q 10/101; G06Q 30/06; G06Q 30/02; G06Q 30/0641; G06Q 10/103; G06Q 10/109; G06Q 20/12; G06Q 30/0605; G06F 21/6218; G06F 17/30011; G06F 2221/2101; G06F 3/0482; G06F 3/1454; G06F 11/3438; H04L 67/02; H04L 67/42
See application file for complete search history.

(56) References Cited

U.S. PATENT DOCUMENTS

| | | | | |
|---|---|---|---|---|
| 5,758,110 A | * | 5/1998 | Boss | G06F 3/0481 715/204 |
| 2005/0132299 A1 | * | 6/2005 | Jones | G06F 3/0481 715/759 |
| 2006/0168533 A1 | * | 7/2006 | Yip | G06Q 10/10 715/753 |
| 2007/0288640 A1 | * | 12/2007 | Schmieder | G06F 3/0481 709/227 |
| 2009/0300510 A1 | * | 12/2009 | Gantman | G06F 3/0481 715/740 |

(Continued)

*Primary Examiner* — Brian J. Gillis
*Assistant Examiner* — Thao D Duong
(74) *Attorney, Agent, or Firm* — Polsinelli PC

(57) ABSTRACT

According to one or more embodiments of the disclosure, a local network device establishes a communication session with a remote network device in the communication network, and designates at least one program from a plurality of programs executable by the local network device for access by the remote network device to yield a designated program. The local network device further generates a shared display object, and associates each designated program with the shared display object to permit display thereof. The local network device further instantiates one or more shared control objects associated with the shared display object, and facilitate access to each designated program for the remote network device using at least one of the one or more shared control objects.

19 Claims, 6 Drawing Sheets

(56) References Cited

U.S. PATENT DOCUMENTS

| | | | | |
|---|---|---|---|---|
| 2010/0122184 A1* | 5/2010 | Vonog | ............... | H04L 12/1827 |
| | | | | 715/753 |
| 2010/0131868 A1* | 5/2010 | Chawla | ............... | G06F 3/044 |
| | | | | 715/759 |
| 2011/0314387 A1* | 12/2011 | Gold | ............... | H04L 12/1827 |
| | | | | 715/751 |
| 2016/0147400 A1* | 5/2016 | Patten | ............... | G06F 3/0484 |
| | | | | 715/753 |

* cited by examiner

MINIMIZING PRODUCTIVITY LOSS IN A COLLABORATIVE SHARING ENVIRONMENT

TECHNICAL FIELD

The present disclosure pertains to communication systems, and more particularly, to improving collaboration amongst parties using local and remote network devices.

BACKGROUND

Communication technologies connect an ever increasing number of people using various communication networks and supports real-time collaborative environments for multiple users, regardless of geographic location.

One type of real-time collaborative environment includes shared desktop applications or programs that allow a remote user access to a local desktop session running on a local network device, using a remote network device. That is, a remote user, using, for example, a home computer, can access a corresponding work computer, including applications, files, and network resources from the work computer, as though the remote user were in front of the work computer. Typically, such desktop sharing applications grant one user—here, the remote user—full access to the work computer.

Another type of a real-time collaborative environment includes web conferencing applications or programs that allow multiple parties, each having their own computer or network device, to connect and access to one or more other parties' network device(s) over a communication network. For example, some web conferencing applications enable multiple attendees access to a shared network device from presenter or local owner (e.g., a desktop owner), which is particularly useful for technical troubleshooting sessions. During a technical troubleshooting session, a technical support engineer—e.g., a remote user—accesses the shared network device to assist the user—e.g., a local user—troubleshoot issues with programs, network connections, and the like. Typically, for these web conferencing applications, the remote user accesses and displays (from a remote device) the local network device similar to the shared desktop programs, discussed above—with full access and as though the remote user were in front of the local network device.

However, conventional real-time collaborative environments, such as those discussed above, typically result in a loss of productivity for the local user(s) by limiting access by the local user to resources on their own local network device when the remote user controls the collaborative session (e.g., a collaborative session can only be controlled by one user at a time).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Unless otherwise specified herein, a component or a feature that is common to more than one drawing is indicated with the same reference number in each of the drawings.

DESCRIPTION OF EXAMPLE EMBODIMENTS

Overview

According to one or more embodiments of the disclosure, a local network device establishes a communication session with a remote network device in the communication network, and designates at least one program from a plurality of programs executable by the local network device for access by the remote network device to yield a designated program. The local network device further generates a shared display object, and associates each designated program with the shared display object to permit display thereof (e.g., by the local network device and/or the remote network device). The local network device also instantiates one or more shared control objects associated with the shared display object, and facilitate access to each designated program for the remote network device using at least one of the one or more shared control objects.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the term "user" refers to a user of an electronic device(s). Actions performed by a user in the context of executable software shall be considered to be actions taken by a user to provide an input to the electronic device(s), such as a network device, to cause the electronic device to perform the steps embodied in executable software.

As used herein, the term "program" or "application" refers to software executable by appropriate computing devices, including network devices.

As used herein, the term "remote" generally refers to being located at a different location (physical, network, or otherwise) or at a different device, or having the ability to access another device or system from the different physical location or the different device.

As used herein, the term "local" is used to distinguish a location or device separate from a remote location or device.

Figure 1:
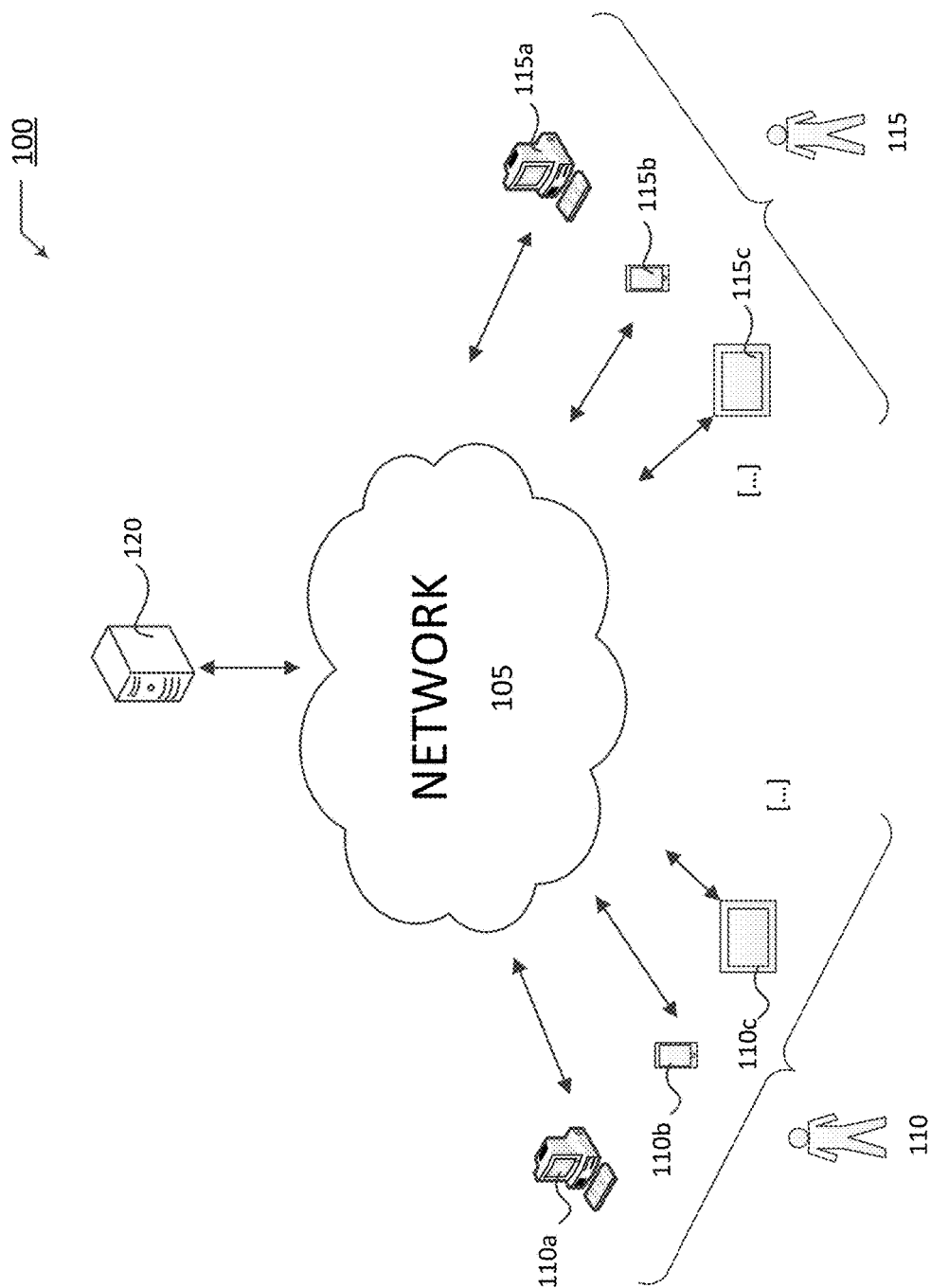
FIG. 1 illustrates an example communication network.

Referring now to FIG. 1, a schematic block diagram of a communication network 100 is illustrated. A communication network is a geographically distributed collection of devices or nodes interconnected by communication links and segments for transporting data between end devise or nodes, such as personal computers and workstations, or other devices, such as tablets, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Illustratively, the various network nodes or devices shown in FIG. 1 are interconnected by a communication network 105, such as the Internet. With respect to the devices, FIG. 1 illustrates network devices 110 (e.g., labeled as shown, "110$a$", "110$b$", "110$c$", " . . . ") associated with a "local" user 110, network devices 115 (e.g., labeled as shown, "115$a$", "115$b$", "115$c$", etc.) associated with a "remote" user 115, and an additional network device 120 (e.g., a host server, and the like) for facilitating communication between devices associated with local user 110 and devices associated with remote user 115. With respect to communication, the network devices shown in FIG. 1 are interconnected within network 105 by various methods of communication. For instance, communication methods may include wired links or wireless communication mediums. Those skilled in the art will understand that any number of nodes, devices, links, etc. may be used in the network 105, and that the view shown herein is for simplicity. Also, while the embodiments are shown herein with reference to "remote" devices associated with user 115 and "local" devices associated with user 110, the description herein is not so limited, and may be applied interchangeably to each of the network devices, remote, local, or otherwise.

Figure 2:
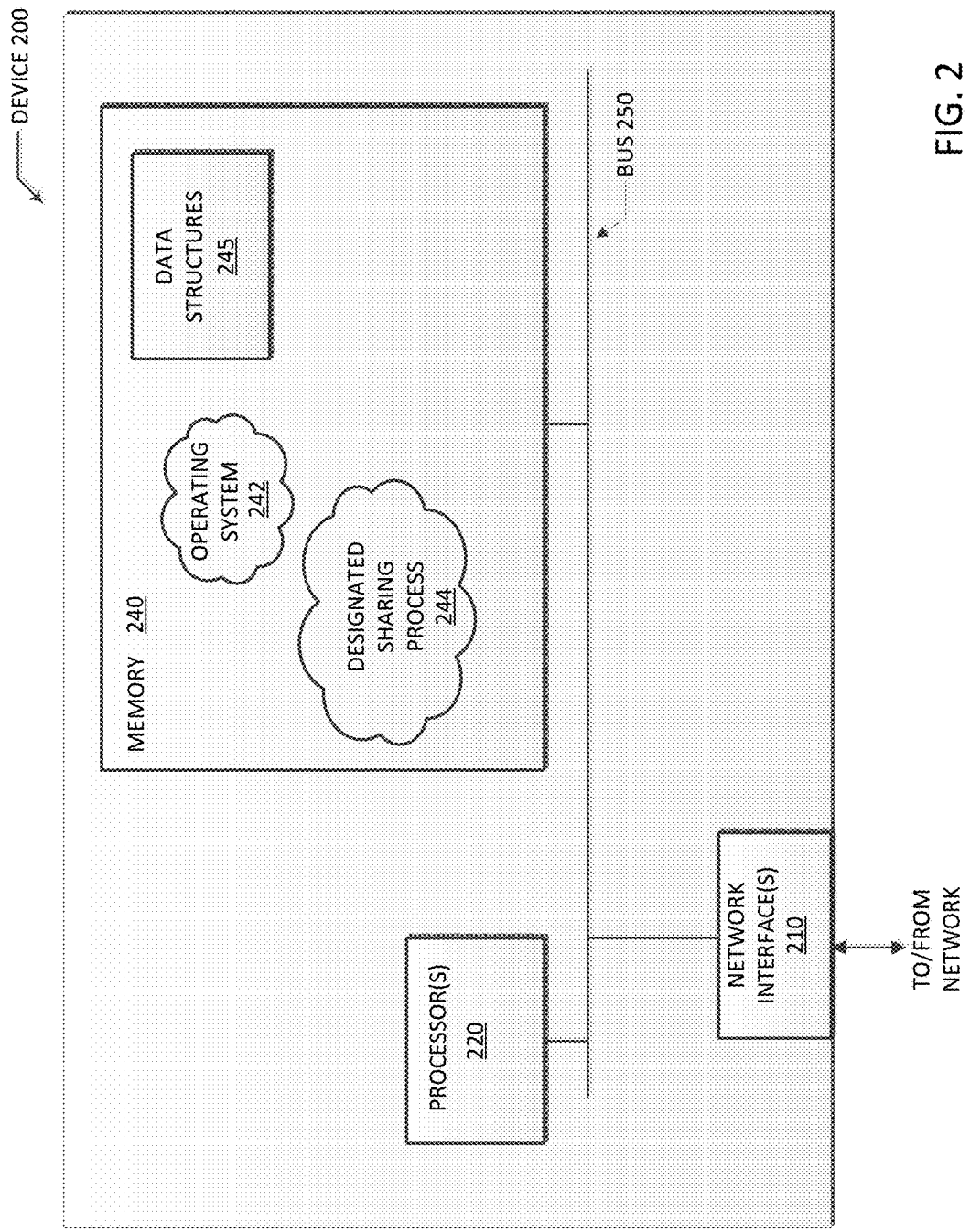
FIG. 2 illustrates an example network device/node.

FIG. 2 is a schematic block diagram of an example node/device 200 that may be used with one or more embodiments described herein, e.g., as a "local" device 110, a "remote" device 115, or even as an additional network device 120 for facilitating communication amongst local and remote devices (e.g. hosting the communication session, etc.). Device 200 may comprise one or more network interfaces 210, at least one hardware processor 220 (e.g., including appropriate hardware and circuitry to execute encoded instructions), and a memory 240 interconnected by a system bus 250.

Network interface(s) 210 contain the mechanical, electrical, and signaling circuitry for communicating data over physical and/or wireless links coupled to network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

Memory 240 comprises a plurality of storage locations that are addressable by processor 220 and network interfaces 210 for storing software programs and data structures associated with the embodiments described herein. As noted herein, certain devices may have limited memory or no memory (e.g., no memory for storage other than for programs/processes operating on the device). Processor 220 may comprise necessary elements or logic adapted to execute the software programs and manipulate data structures 245, such as tables, routes or prefixes. An operating system 242, portions of which are typically resident in memory 240 and executed by the processor, functionally organizes the device by, inter alia, invoking operations in support of software processes and/or services executing on the device. These software processes and/or services may comprise a designated sharing process/service 244. Designated sharing process (services) 244 includes computer executable instructions executed by processor 220 to perform functions provided by one or more collaborative sharing techniques discussed herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Operatively, the techniques described herein, including functions relating to such techniques, may be performed by hardware, software, and/or firmware, such processor 220 or an independent processor of network interfaces 210.

As noted above, conventional real-time collaborative environments typically result in a loss in productivity for local users when the local device is accessed by remote users. For example, when a remote user, using a remote device, accesses a local user's local device for troubleshooting, the remote user typically has shared control of inputs—e.g., keyboard, mouse, display, and the like. During such troubleshooting, the local user is regaled to the role of observer so as not to interrupt the troubleshooting process—e.g., interfering with the remote user's control of the inputs. Accordingly, the collaborative sharing techniques disclosed herein alleviate such loss in productivity during collaborative or shared communication sessions by providing the local user options to designate portions of the local device such as applications or programs, for sharing within a shared area, while retaining full access to non-designated applications or programs for the local user.

Figure 3:
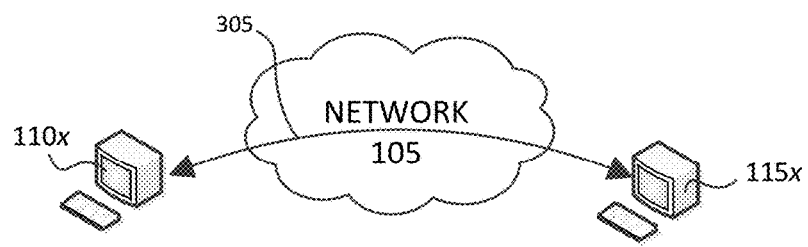
FIG. 3 illustrates an example view of a local network device and a remote network device establishing a shared communication session.

For example, referring to FIG. 3, a local network device 110$x$ (e.g., operable by a local user 110), establishes a communication session 305 with a remote network device 115$x$ (e.g., remote user 115). Typically, the local network device connects with a network server such as network device 120 (shown in FIG. 1), which hosts a communication session such as a collaborative sharing environment (e.g., a web-conference, etc.), for local network device 110$x$ and remote network device 115$x$. Such a collaborative sharing environment is illustrated by exemplary views shown in FIGS. 4, 5, and 6. For purposes of discussion, not limitation, functionality of the collaborative sharing environment is described with respect to the local network device 110$x$ and remote network device 115$x$, including displays associated with each device (e.g., a "local" display and a "remote" display). Moreover, network devices 110$x$ and 115$x$ may generally represent any type of appropriate computing device (e.g., mobile devices, computers, laptops, tablets, work stations, terminals, and the like), as is appreciated by those skilled in the art.

Figure 4:
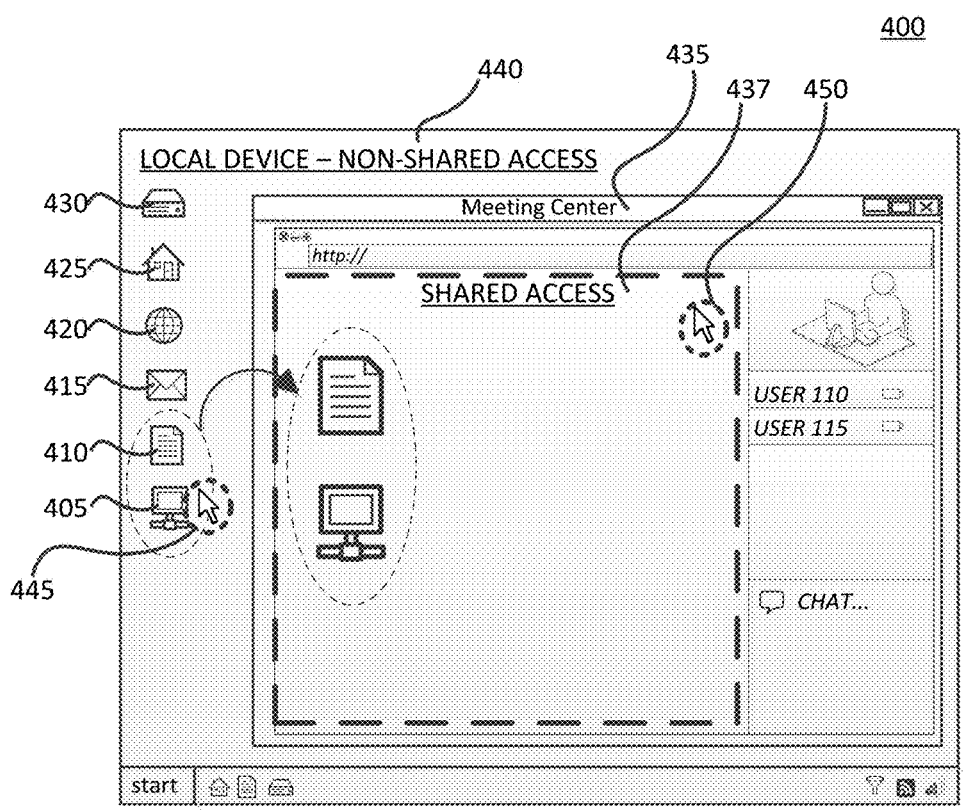
FIG. 4 illustrates an example view of a local display during the shared communication session.

FIG. 4 illustrates an example view 400 of a local display associated with the local network device 110$x$ during the shared communication session 305. As discussed above, the collaborative sharing techniques allow local network device 110x to designate specific local programs or applications (e.g., locally stored programs executable by the local network device) for shared access by remote network device 115x. As shown in view 400, two programs 405 and 410 are selected or designated (e.g., by user 110) from the plurality of local programs 415, 420, 425 and 430 for shared access by the remote network device 115x. Illustratively, the designated programs are further associated with a shared display object such as a shared access area 437 within a collaborative shared window 435, which is displayed on a portion of the local display.

In particular, during the shared communication session 305, local network device 110x and/or remote network device 115x share access to designated programs 405 and 410 displayed in a shared access area 437. In addition, shared access area 437 displays interactions or activity from local network device 110x and/or remote network device 115x with the designated programs 405 and 410 allowing local user 110 and remote user 115 to monitor such interactions. Operatively, local user 110 designates programs for shared access and display in shared access area 437 using various means, such as drag and drop, selecting from a list, and the like, as is appreciated by those skilled in the art. Additionally, as shown, the collaborative shared window 435 also supports real-time video conferencing with remote user 115 and interactive dialog options—"Chat".

Importantly, as discussed above, the shared access area 437 facilitates or provides shared access for designated programs to remote users, using remote network devices, while maintaining independent access to non-designated programs for local users, using local network devices. In particular, non-designated programs 415, 420, 425 and 430 are independently accessible by local device 110x—shown in the non-shared access display area 440—while designated programs 405 and 410 are shared with remote network device 115x during the shared communication session 305. In this fashion, local user 110, using local device 110x continues to access non-designated programs while remote user 115, using remote device 115x, can access, troubleshoot, interact with, or otherwise manipulate the designated programs 405 and 410. Put differently, local device 110x continues to access non-designated applications independently of designated programs, which are shared with remote device 115x. As discussed in greater detail below, local network device 110x typically provides separate control objects (e.g., displayed as pointers, cursors, etc.) for the non-shared access area 440 and for the shared access area 437 to enable the local user 110 to continue to access non-designated programs on local network device 110x. For example, the local network device 110x can instantiate "shared" control objects associated with the shared access area 437 and also maintain "local" control objects associated with the non-shared access area 440. Preferably, local network device 110x maintains an association between local input devices or local peripherals such as a mouse/keyboard/etc., with the "local" control objects, and also associates remote input devices or remote peripherals with the instantiated "shared" control objects. Instantiating "shared" control objects (independent from "local" control objects) and association of the "shared" control objects with the remote input devices allows a local user to continue to work/access non-designated programs on the local network device 110x without relinquishing control over the local input devices, which ultimately minimizes productivity loss for local and remote users during the shared communication session.

With respect to control objects, local network device 110x can instantiate one or more control objects and associate each control object with the shared display object (e.g., displayed as the shared access area 437). As shown in FIG. 4, the control objects may include a shared pointer 450. Operatively, shared pointer 450 is displayed on the local display within shared access area 437, by local network device 110x. In preferred embodiments, shared control objects, such as shared pointer 450, are restricted to or fenced in by shared access area 437, and may only interact with designated programs 410 and 405. Moreover, for these preferred embodiments, local network device 110x typically differentiates the shared control objects from local control objects—e.g., shared pointer 450 is displayed in a different color than a local pointer 445. In certain preferred embodiments, the local control objects and the shared control objects are distinguishable by varying shapes, sizes, colors, and the like.

The shared control objects are also assigned to corresponding input devices or peripherals—e.g., a local input device, a remote input device, or both local and remote input device(s). For example, shared pointer 450 can be assigned to a remote input device (e.g., a remote mouse) operable by remote network device 115x, while local pointer 445 can be assigned to a local input device (e.g., a local mouse) operable by local network device 110x. In certain instances, shared control objects and local control objects can be assigned to the same input device—e.g., when local pointer 445 interacts with shared access area 437, local pointer 445 and shared pointer 450. In such instances, the local input device and the remote input device can be both assigned to the shared control object, which can result in potentially conflicting input commands for the shard control object. To resolve the conflicting input commands, certain embodiments provide a priority scheme whereby one input device—e.g., either a local input device or a remote input device—controls the shared control object during interaction between the corresponding local network device 110x or remote network device 115x and shared access area 437. In other embodiments, input control for the shared access area 437 can be exchanged between local network device 110x and remote network device 115x using a selectable menu, an input command option (e.g., a mouse click, a keystroke, active window command, etc.), and the like.

Moreover, when local network device 110x interacts with shared access area 437 and assigns a local input device to the shared control object, local network device 110x may remove differentiation between the shared control object—e.g., the shared pointer 450—and the local control object—e.g., the local pointer 445—resulting in display of a single control object—e.g., a single pointer—as is appreciated by those skilled in the art. Further, although the shared control object shown in view 400 of the local display is a pointer object, the shared control object can include any type of figure, shape, representation, etc., as is appreciated by those skilled in the art.

Figure 5:
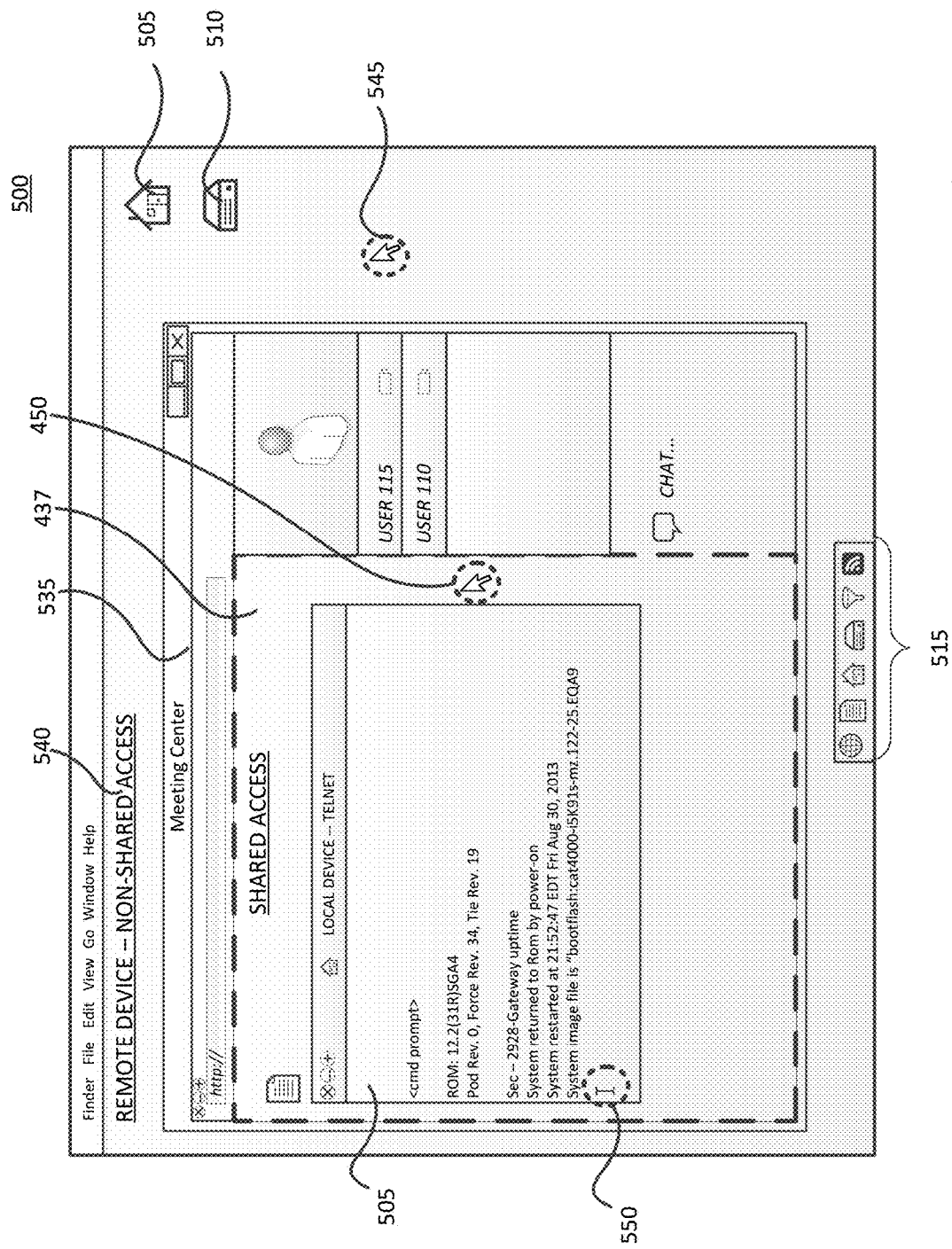
FIG. 5 illustrates an example view of a remote display during the shared communication session.

FIG. 5 illustrates an example view 500 of a remote display associated with the remote network device 115x for the shared communication session 305. Similar to example view 400, discussed above, remote device 115x displays a collaborative shared window 535 on the remote display, which corresponds to collaborative shared window 435. Collaborative shared window 535 displays shared access area 437, the designated programs 405 and 410, and shared control object 450. Additionally, view 500 shows remote user 115 interacting with one of the designated programs in shared access area 437, using a command prompt display 505 (e.g., to access the designated program, troubleshoot an issue, etc.). In addition to shared control object 450, view 500 also illustrates a second shared control object—a shared cursor 550. As discussed above, the shared control objects can be assigned to various input devices for the local network device, the remote network device, and combinations thereof. As shown here, the shared cursor 550 can be assigned to a remote input device such as a remote keyboard corresponding to remote network device 115*x*. Preferably, remote network device 115*x*, like local network device 110*x*, maintains independent access remote programs, shown in a non-shared access area 540 (e.g., including, non-shared programs 505, 510, and 515). Further, remote device 115*x* can maintain a non-shared remote control object such as a remote pointer 545 for a corresponding remote input device.

Figure 6:
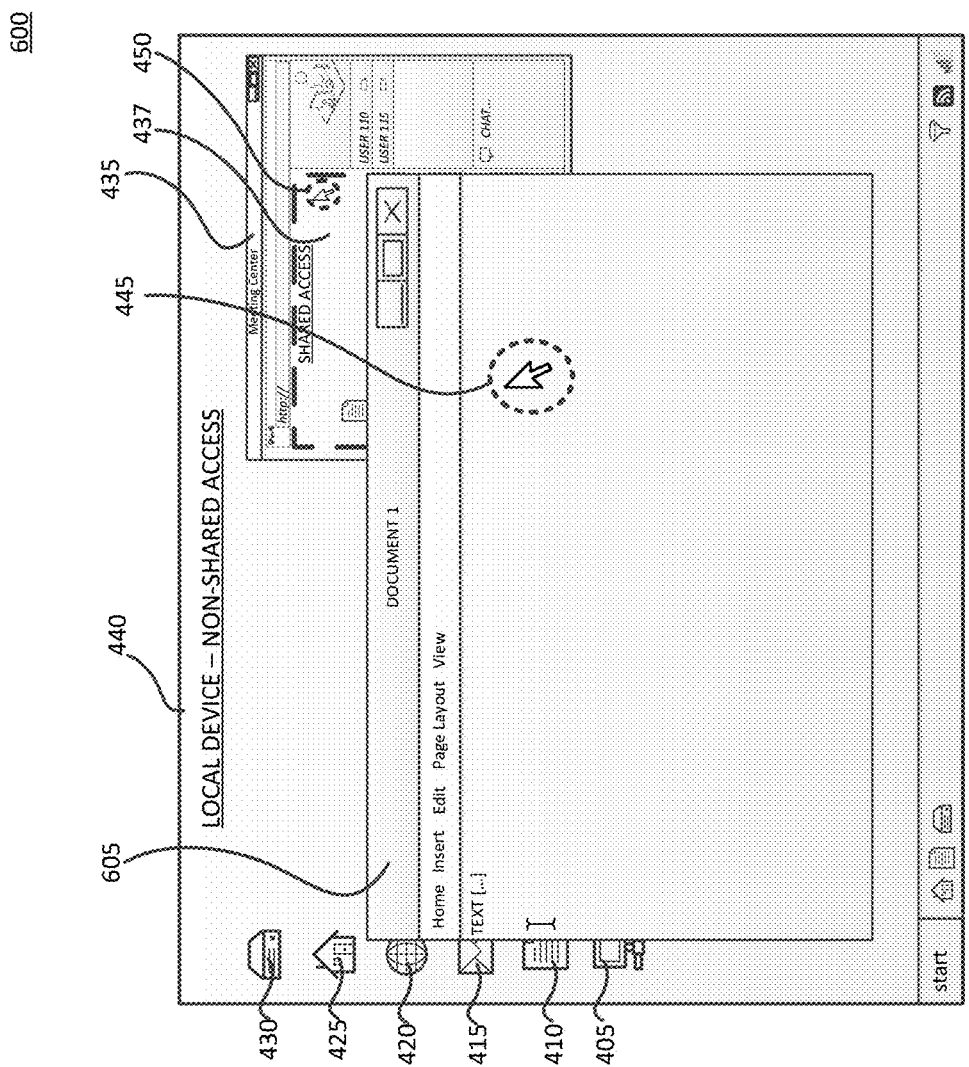
FIG. 6 illustrates an example view of the local display during the shared communication session, showing a local user accessing non-designated programs.

FIG. 6 illustrates an example view 600 of the local display during the shared communication session 305, showing local user 110 accessing one of the non-designated programs, represented by a document window 605, during the shared communication session 305. As discussed in greater detail above, local user 110 can access the non-designated programs during the shared communication session, which minimizes productivity loss for both local and remote users. In addition to maintaining independent access to the non-designated programs, local network device 110*x* also allows local user 110 to re-dimension or resize display of the collaborative shared window 435, independent from the dimensions of collaborative shared window 535 displayed by remote network device 115*x*. Independently resizing collaborative shared window 435 on each local network device 110*x* and remote network device 115*x* provides additional flexibility for local and remote users to minimize productivity loss during the shared communication session. For example, local user 110 may decrease or minimize display of collaborative shared window 535 on the local display to focus on work with the non-designated programs, while remote user 115 may increase or maximize display of the collaborative shared window 435 on the remote display to focus on troubleshooting an issue with the designated programs.

Figure 7:
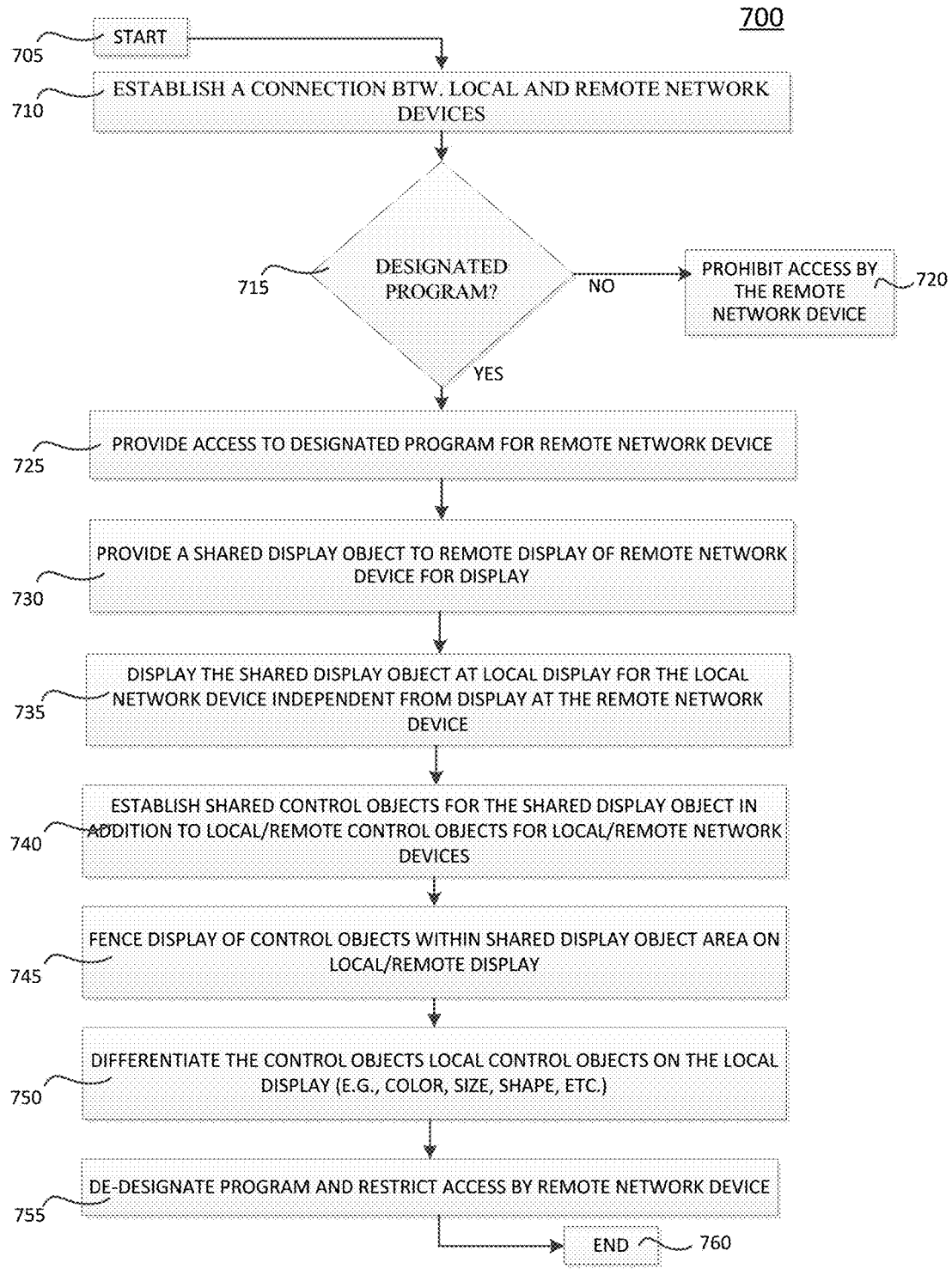
FIG. 7 illustrates an example simplified procedure for minimizing productivity loss in a collaborative sharing environment, particularly from the perspective of a local network device.

FIG. 7 illustrates an example simplified procedure 700 for minimizing productivity loss in a collaborative sharing environment, particularly from the perspective of a local network device, in accordance with one or more embodiments described herein (e.g., designated sharing process 244).

Procedure 700 begins at step 705 and continues to step 710 where, as discussed above, the local network device establishes a communication session with one or more remote network devices. Next, the local network device determines if a program is designated for shared access (e.g., a designated program) in decision step 715. If the program is not designated, the local network device prohibits access by the remote network device in step 720.

In contrast, if the program is designated for shared access, the local network device provides access to the designated programs to the remote network device, in step 725. For example, the local network device can associate designated programs with shared display objects such as the shared access area, discussed above, and provide the shared display object to the remote device for display on a corresponding remote display, shown in step 730.

Optionally, in step 735, the shared display object is displayed on a local display independent from display on the remote display to allow users flexibility in sizing, positioning, or other adjustment to display the shared display object.

Local network device further establishes or instantiates shared control objects to interact with or manipulate the shared display object in step 740. For example, the shared control object can include cursors, pointers, or other shared control objects, which are assigned to local and/or remote input devices or peripherals (keyboard, mouse, etc.). Preferably, the shared control objects are established independent from local and/or remote control objects such that the local user and/or remote user can interact with or manipulate non-designated programs using local and/or remote input devices or peripherals. In addition, the shared control objects, are typically fenced within or restricted to the shared display object, shown in step 745, and can only interact with or manipulate designated programs (e.g., displayed in the shared access area 437). In some embodiments, the local network device also differentiates or distinguishes the shared control objects from local control objects (e.g., by color, size, shape, etc.), shown in step 750.

Optionally, the local network device can de-designate a program during the shared communication session, in step 755, and restrict access from the remote network device. Procedure 700 subsequently ends in step 760, but may return to step 705 to establish a shared communication session with the remote network device.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, minimize productivity loss in a collaborative sharing environment for local and remote users. In particular, the techniques herein significantly specify or designate shared access to particular programs for a local network device, while maintaining independent access to non-designated programs by the local user during a shared communication session. In this fashion, the local user can continue to work with non-designated programs while a designated program is accessed by a remote user for troubleshooting, and the like. Moreover, the techniques described herein also leverages shared control objects in addition to local/remote control objects to allow local/remote users independent access to non-designated programs during the shared communication session. The techniques may further integrate directly with conventional sharing programs (e.g., WebEx desktop sharing sessions, etc.).

While there have been shown and described illustrative embodiments that provide for minimizing productivity loss in the collaborative sharing environment, it is to be understood that various other adaptations and modifications may be made within the spirit and scope of the embodiments herein. For example, the embodiments have been shown and described herein with relation to a local network device and a remote network device, with particular functionality carried out by each device. However, the embodiments in their broader sense are not as limited, and may, in fact, be employed by other network devices (e.g., network device 120), which can host the collaborative sharing environment and employ any of the techniques described herein. Moreover, while certain views are shown, such as from the perspective of a particular network device, such views are for purposes of illustration, not limitation.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    establishing, by a local network device, a real-time communication session with a remote network device in a communication network;
    designating, by the local network device, at least one program from a plurality of programs executable by the local network device for access by the remote network device to yield a designated program, the designating of the at least one program to yield the designated program including a drag and drop operation;
    generating, by the local network device, a shared display object having a shared access area;
    associating, by the local network device, the designated program with the shared display object to permit display of at least a portion of the designated program by the local network device and the remote network device;
    instantiating, by the local network device, one or more shared control objects associated with the shared display object, the one or more shared control objects including a shared pointer, the shared pointer separately displayed with a local pointer assigned to the local network device;
    facilitating, by the local network device, access to the designated program for the remote network device using at least one of the one or more shared control objects;
    restricting, by the local network device, interaction of the one or more shared control objects to the designated program by fencing the one or more shared control objects within the shared access area; and
    maintaining, by the local network device, access for the local network device to each program not designated by the local network device when the remote network device accesses the designated program using at least one of the one or more shared control objects.

2. The method of claim 1, wherein maintaining, by the local network device, access for the local network device to each program not designated by the local network device, further comprises:
    maintaining, by the local network device, access for the local network device to each program not designated by the local network device using one or more local control objects.

3. The method of claim 1, further comprising:
    removing, by the local network device, a designation for the designated program to prohibit access by the remote network device.

4. The method of claim 1, wherein the facilitating of the access to the designated program includes:
    providing, by the local network device, the shared display object to the remote network device to cause the remote network device to display the shared display object on a portion of a remote display associated with the remote network device;
    displaying, by the local network device, the shared display object on a portion of a local display associated with the local network device; and
    adjusting, by the local network device, a display area associated with the portion of the local display displaying the shared display object independently from a display area associated with the portion of the remote display displaying the shared display object.

5. The method of claim 4, wherein the shared display object is a display window.

6. The method of claim 4, further comprising:
    displaying, by the local network device, the one or more shared control objects on the portion of the local display that displays the shared display object;
    providing, by the local network device, the one or more shared control objects to the remote network device to cause the remote network device to display the one or more shared control objects on the portion of the remote display that displays the shared display object; and
    restricting, by the local network device, display of each shared control object to the portion of the local display that displays the shared display object and the portion of the remote display that displays the shared display object.

7. The method of claim 1, further comprising:
    displaying, by the local network device, the shared display object and the one or more shared control objects on a local display;
    displaying, by the local network device, one or more local control objects associated with corresponding local input devices on the local display; and differentiating, by the local network device, the display of the one or more shared control objects from the one or more local control objects on the local display.

8. The method of claim 1, further comprising:
assigning, by the local network device, each shared control object of the one or more shared control objects to a corresponding remote input device associated with the remote network device.

9. The method of claim 8, further comprising:
assigning, by the local network device, each shared control object of the one or more shared control objects to a corresponding local input device associated with the local network device when input commands from the local input device correspond to the shared display object.

10. The method of claim 1, wherein the local pointer is assigned to the local network device.

11. The method of claim 1, wherein the local pointer and the shared pointer are displayed via different colors and/or sizes.

12. A local network device comprising:
one or more network interfaces to communicate within a communication network;
a processor coupled to the network interfaces and adapted to execute one or more processes; and
a memory configured to store a process executable by the processor that, when executed, is operable to:
establish a real-time communication session with a remote network device in the communication network;
designate at least one program from a plurality of programs executable by the local network device for access by the remote network device to yield a designated program, the at least one program designated to yield the designated program via a drag and drop operation;
generate a shared display object having a shared access area;
associate each designated program with the shared display object to permit display of at least a portion of each designated program by the local network device and the remote network device;
instantiate one or more shared control objects associated with the shared display object, the one or more shared control objects including a shared pointer, the shared pointer separately displayed with a local pointer assigned to the local network device;
facilitate access to each designated program for the remote network device using at least one of the one or more shared control objects;
restrict interaction of the one or more shared control objects to the designated program by fencing the one or more shared control objects within the shared access area; and
maintain access for the local network device to each program not designated by the local network device when the remote network device accesses each designated program using at least one of the one or more shared control objects.

13. The local network device of claim 12, wherein the process, when executed by the processor to maintain access for the local device to each program not designated by the local device, is further operable to:
maintain access for the local network device to each program not designated by the local network device using one or more local control objects.

14. The local network device of claim 12, wherein the process to facilitate access to each designated program for the remote network device, when executed by the processor, is further operable to:
provide the shared display object to the remote network device to cause the remote network device to display the shared display object on a portion of a remote display associated with the remote network device;
display the shared display object on a portion of a local display associated with the local network device; and
adjust a display area associated with the portion of the local display displaying the shared display object independent from a display area associated with the portion of the remote display displaying the shared display object.

15. The local network device of claim 14, wherein the process, when executed by the processor, is further operable to:
display the one or more shared control objects on the portion of the local display displaying the shared display object;
provide the one or more shared control objects to the remote network device to cause the remote network device to display the one or more shared control objects on the portion of the remote display displaying the shared display object; and
restrict display of each shared control object to the portion of the local display displaying the shared display object and the portion of the remote display displaying the shared display object.

16. The local network device of claim 12, wherein the process, when executed by the processor, is further operable to:
display the shared display object and the one or more shared control objects on a local display;
display one or more local control objects associated with corresponding local input devices on the local display; and
differentiate the display of the one or more shared control objects from the one or more local control objects on the local display.

17. A tangible, non-transitory, computer-readable media having software encoded thereon, the software, when executed by a processor, operable to:
establish a real-time communication session with a remote network device in a communication network;
designate at least one program from a plurality of programs executable by a local network device for access by the remote network device to yield a designated program, the at least one program designated to yield the designated program via a drag and drop operation;
generate a shared display object having a shared access area;
associate each designated program with the shared display object to permit display of at least a portion of each designated program by the local network device and the remote network device;
instantiate one or more shared control objects associated with the shared display object, the one or more shared control objects including a shared pointer, the shared pointer separately displayed with a local pointer assigned to the local network device;
facilitate access to each designated program for the remote network device using at least one of the one or more shared control objects;

restrict interaction of the one or more shared control objects to the designated program by fencing the one or more shared control objects within the shared access area; and maintain access for the local network device to each program not designated by the local network device when the remote network device accesses each designated program using at least one of the one or more shared control objects.

18. The tangible, non-transitory, computer-readable media of claim 17, wherein the software, when executed by the processor to facilitate access to each designated program for the remote network device, is further operable to:

provide the shared display object to the remote network device to cause the remote network device to display the shared display object on a portion of a remote display associated with the remote network device;

display the shared display object on a portion of a local display associated with the local network device; and adjust a display area associated with the portion of the local display displaying the shared display object independent from a display area associated with the portion of the remote display displaying the shared display object.

19. The tangible, non-transitory, computer-readable media of claim 18, wherein the software, when executed by the processor, is further operable to:

display the one or more shared control objects on the portion of the local display displaying the shared display object;

provide the one or more shared control objects to the remote network device to cause the remote network device to display the one or more shared control objects on the portion of the remote display displaying the shared display object; and restrict display of each shared control object to the portion of the local display displaying the shared display object and the portion of the remote display displaying the shared display object.

* * * * *